(12) United States Patent
Schulz et al.

(10) Patent No.: US 8,426,823 B2
(45) Date of Patent: Apr. 23, 2013

(54) REFLECTOR AND LIGHT COLLIMATOR ARRANGEMENT FOR IMPROVED LIGHT COLLECTION IN SCINTILLATION DETECTORS

(75) Inventors: Volkmar Schulz, Wureselen (DE); Carsten Degenhardt, Aachen (DE); Jerome J. Griesmer, Mentor, OH (US); Steven E. Cooke, Garfield Heights, OH (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 521 days.

(21) Appl. No.: 12/673,774

(22) PCT Filed: Aug. 12, 2008

(86) PCT No.: PCT/IB2008/053230
§ 371 (c)(1),
(2), (4) Date: Feb. 17, 2010

(87) PCT Pub. No.: WO2009/024895
PCT Pub. Date: Feb. 26, 2009

(65) Prior Publication Data
US 2011/0017916 A1    Jan. 27, 2011

Related U.S. Application Data

(60) Provisional application No. 60/957,223, filed on Aug. 22, 2007.

(51) Int. Cl.
*G01T 1/20*    (2006.01)
(52) U.S. Cl.
USPC ................ 250/368; 250/369; 250/370.11
(58) Field of Classification Search .............. 250/368
See application file for complete search history.

(56) References Cited

U.S. PATENT DOCUMENTS

| 4,948,978 A | 8/1990 | Guyot | |
|---|---|---|---|
| 5,144,141 A * | 9/1992 | Rougeot et al. | 250/369 |

(Continued)

FOREIGN PATENT DOCUMENTS

| EP | 0250983 A1 | 1/1988 |
|---|---|---|
| EP | 0534683 A2 | 3/1993 |

(Continued)

OTHER PUBLICATIONS

Otte, A. N., et al.; A test of silicon photomultipliers as readout for PET; 2005; Nuclear Instruments and Methods in Physics Research A; 545:705-715.

*Primary Examiner* — David Porta
*Assistant Examiner* — Taeho Jo

(57) ABSTRACT

In nuclear imaging, when a gamma ray strikes a scintillator, a burst of visible light is created. That light is detected by a photodetector and processed by downstream electronics. It is desirable to harness as much of the burst of light as possible and get it to the photodetector. In a detector element (18), a first reflective layer (44) partially envelops a scintillation crystal (34). The first reflective layer (44) diffuses the scintillated light. A second reflective layer (46) and a support component reflective layer (48) prevent the light from leaving the scintillation crystal (34) by any route except a light emitting face (36) of the scintillator (34). In another embodiment, a light concentrator (50) is coupled to the scintillator (34) and channels the diffuse light onto a light sensitive portion of a photodetector (38). The reflective layers (44, 46, 48) and the concentrator (50) ensure that all or nearly all of the light emitted by the scintillator (34) is received by the photodetector (38).

20 Claims, 8 Drawing Sheets

U.S. PATENT DOCUMENTS

| | | | |
|---|---|---|---|
| 5,378,894 A | | 1/1995 | Akai |
| 5,453,623 A | * | 9/1995 | Wong et al. ............... 250/363.03 |
| 5,633,498 A | * | 5/1997 | Savicki .......................... 250/353 |
| 6,078,052 A | | 6/2000 | DiFilippo |
| 6,207,958 B1 | * | 3/2001 | Giakos ....................... 250/385.1 |
| 6,946,841 B2 | * | 9/2005 | Rubashov .................... 324/318 |
| 7,132,664 B1 | * | 11/2006 | Crosetto ....................... 250/367 |
| 7,180,074 B1 | * | 2/2007 | Crosetto ................. 250/370.09 |
| 7,193,208 B1 | * | 3/2007 | Burr et al. ..................... 250/300 |
| 7,217,928 B2 | * | 5/2007 | Crosetto ....................... 250/366 |
| 2003/0178570 A1 | * | 9/2003 | Tsunota et al. .......... 250/370.11 |
| 2004/0159792 A1 | * | 8/2004 | Andreaco et al. ........ 250/363.03 |
| 2004/0164249 A1 | * | 8/2004 | Crosetto ....................... 250/367 |
| 2005/0035297 A1 | * | 2/2005 | Crosetto ....................... 250/367 |
| 2005/0104000 A1 | * | 5/2005 | Kindem et al. ........... 250/361 R |
| 2005/0129171 A1 | | 6/2005 | Jiang et al. |
| 2005/0211906 A1 | * | 9/2005 | Tonami et al. ................. 250/367 |
| 2006/0192128 A1 | | 8/2006 | Benlloch Bavciera et al. |
| 2007/0081626 A1 | * | 4/2007 | Rule et al. ........................ 378/47 |
| 2007/0096031 A1 | | 5/2007 | Meier et al. |
| 2007/0181814 A1 | * | 8/2007 | Crosetto ....................... 250/368 |
| 2008/0099684 A1 | * | 5/2008 | Murakami et al. ........ 250/361 C |
| 2011/0133091 A1 | | 6/2011 | Frach et al. .................... 250/362 |
| 2011/0220803 A1 | * | 9/2011 | Ohi et al. ...................... 250/369 |
| 2011/0278466 A1 | * | 11/2011 | Frach et al. .............. 250/370.11 |
| 2012/0085942 A1 | * | 4/2012 | Birman et al. ............. 250/505.1 |

FOREIGN PATENT DOCUMENTS

| | | | |
|---|---|---|---|
| EP | 1148349 A1 | 10/2001 | |
| WO | 2006107727 A2 | 10/2006 | |
| WO | 2006111869 A2 | 10/2006 | |
| WO | WO2007028562 * | 3/2007 | ................... 250/566 |

\* cited by examiner

REFLECTOR AND LIGHT COLLIMATOR ARRANGEMENT FOR IMPROVED LIGHT COLLECTION IN SCINTILLATION DETECTORS

CROSS REFERENCE TO RELATED APPLICATIONS

This application claims the benefit of U.S. provisional application Ser. No. 60/957,223 filed Aug. 22, 2007, which is incorporated herein by reference.

The present application relates to the electromagnetic radiation detection arts. It finds particular application in conjunction with detecting gamma radiation during nuclear imaging scan. It is to be understood, however, that it also finds application in other detectors where visible light is collected and is not limited to the aforementioned application.

In pixelated scintillator/solid state detectors, the scintillators are often rectangular prisms. One face faces the solid state detector and an opposite face faces the radiation source. To maximize the radiation collection efficiency, these two faces are as large as possible, i.e. the scintillators are tightly packed. The thickness of structures, such as reflective material is minimized.

A significant problem lies in reliably collecting the light that is produced. The light sensitive region of a solid state detector only covers a fraction of the surface facing the scintillator. Because the scintillator typically has a cross-section that matches that of the solid state detector, the light sensitive region is smaller than the abutting scintillator face.

Mirrored surfaces have been used on five faces of a rectangular prism shaped scintillator. It has been found, however, that better performance is achieved with a reflective material that has diffusive reflection characteristics. A diffusive reflector seems to lead to an improved photon collection efficiency relative to a mirrored surface. A specular reflector attached directly to the scintillator tends to worsen collection efficiencies.

Polymers such as polytetrafluoroethelene, and for example, Teflon™ can be a diffuse reflector. In a typical pixelated PET detector, the scintillator is divided up into small pixels. An exemplary pixel dimension might be 4 mm×4 mm×25 mm. Each pixel is wrapped with Teflon™ on five sides and the light is emitted from the sixth side which is coupled to a photodetector. One drawback of this type of setup is that Teflon™ has a relatively high transmittance of the generated photons. This leads to optical crosstalk between the scintillators. The optical crosstalk can degrade the performance of a detector in several ways. First, the accuracy of the logic that is used to identify the scintillating crystal is reduced. This leads to a higher probability of crystal or scintillator misidentification and thus to reduced spatial resolution of the scanner. Additionally, if the scintillation takes place in a crystal at the edge of the scintillation array, photons can be lost, since they can leave the array and not be detected by any photodetector. This can lead to reduced energy resolution of edge pixels in the detector array. Also, the spread of the optical photons over a large area leads to an increase in the possibility of pile-up. At high count rates this problem occurs more often, and the probability for scintillation pulses to overlap is increased. This can lead to a degradation in spatial, energy, and timing resolution.

Another issue resides in the fact that the scintillators are typically larger than the photodetecting elements to which they are coupled. Arrays of small avalanche photodiodes operating in Geiger mode, e.g., silicon photomultipliers (SiPMs), have the potential to replace prior photomultiplier tubes (PMTs). Exact timing, down to the picosecond range is valuable in time of flight PET (TOF-PET) scanners. The light sensitive region of an SiPM is only a fraction of the total area of the face. The rest of the faces are light inert or dead space.

The consequence of this dead space between SiPMs is that some light emitted by the scintillator will not be collected by the SiPM. In an example of a 4×4 mm scintillator coupled to a 4×4 mm SiPM with a 2×2 mm light sensitive region, the collection efficiency is reduced to 25%. Three-fourths of the light output is lost. This reduced detection efficiency degrades spatial, energy, and time resolution by about a square root of the area fraction.

A silicon photomultiplier (SiPM) cell can include accompanying electronics such as an avalanche photodiode (APD) in series with a quenching resistor. The presence of the accompanying electronics actually further diminishes the photosensitive area of the complete package. Significant distances between light sensitive portions exist, reducing the overall effectiveness of the detector. The greater the reduction of the sensitive area, the greater probability that the detector will have worse energy and time resolution.

The present application provides a new and improved method and apparatus to more efficiently and completely harness generated light to sensitive portions of photodetecting elements, which overcomes the above-referenced problems and others.

In accordance with one aspect, a radiation detector array is provided. A plurality of scintillation crystals emit bursts of visible light in response to radiation. A plurality of photodetectors have light sensitive regions with a surface area that is optically coupled to a light emitting face of the scintillation crystal. A first diffuse reflective layer at least partially encapsulates each scintillation crystal. The first reflective layer diffusely reflects a portion of the light generated by the scintillation crystal. A second specular reflective layer reflects light from the scintillation crystal that exits the first diffuse reflective layer back into the scintillation crystal.

In accordance with another aspect, a method of radiation detection is provided. Visible light is emitted by a scintillation crystal when the scintillation crystal is struck by a high energy photon. The visible light is diffused with a first diffuse reflective layer that at least partially encloses the scintillation crystal. The visible light from the scintillation crystal that exits the first diffuse reflective layer is reflected back into the scintillation crystal with a second specular reflective layer. The visible light is allowed to leave the scintillation crystal from a light emitting face of the scintillation crystal. The visible light is detected by a photodetector that has a light receiving face.

In accordance with another aspect, a radiation detector array element is provided. A scintillation crystal emits visible light in response to high energy photons. A first diffuse reflective layer at least partially envelops the scintillation crystal and diffuses the visible light. A second specular reflective layer at least partially envelops the scintillation crystal and the first reflective layer. The second reflective layer reflects the visible light that exits the first diffuse reflective layer back into the scintillation crystal. A light concentrator is optically coupled to the light emitting face of the scintillation crystal. The light concentrator channels light emitted from the light emitting face of the scintillation crystal. A photodetector has a light receiving face that is optically coupled to the light concentrator. The light receiving face has an optically sensitive region with a surface area that is smaller than the light emitting face of the scintillation crystal. The photodetector detects the visible light channeled by the light concentrator.

In accordance with another aspect, a radiation detector array element is provided. A photodetector has a light sensitive region of a first cross section. A scintillation crystal has a light emitting face of a second cross section, the second cross section being larger than the first cross section. A light concentrator has a light receiving face of the second cross section optically coupled to the scintillation crystal light emitting face. The concentrator has a light discharging face of the first cross section optically coupled to the photodetector light sensitive face.

One advantage lies in increased efficiency of light collection.

Another advantage resides in more reliable detection of radiation events.

Another advantage lies in the ability to use scintillators and detectors of different sizes.

Another advantage resides in reduced optical crosstalk between scintillators.

Another advantage resides in improved light collection on the boundaries of a detector array.

Another advantage lies in ease of implementation.

Another advantage lies in increased timing and energy resolution.

Still further advantages of the present invention will be appreciated to those of ordinary skill in the art upon reading and understanding the following detailed description.

The invention may take form in various components and arrangements of components, and in various steps and arrangements of steps. The drawings are only for purposes of illustrating the preferred embodiments and are not to be construed as limiting the invention.

Figure 1:
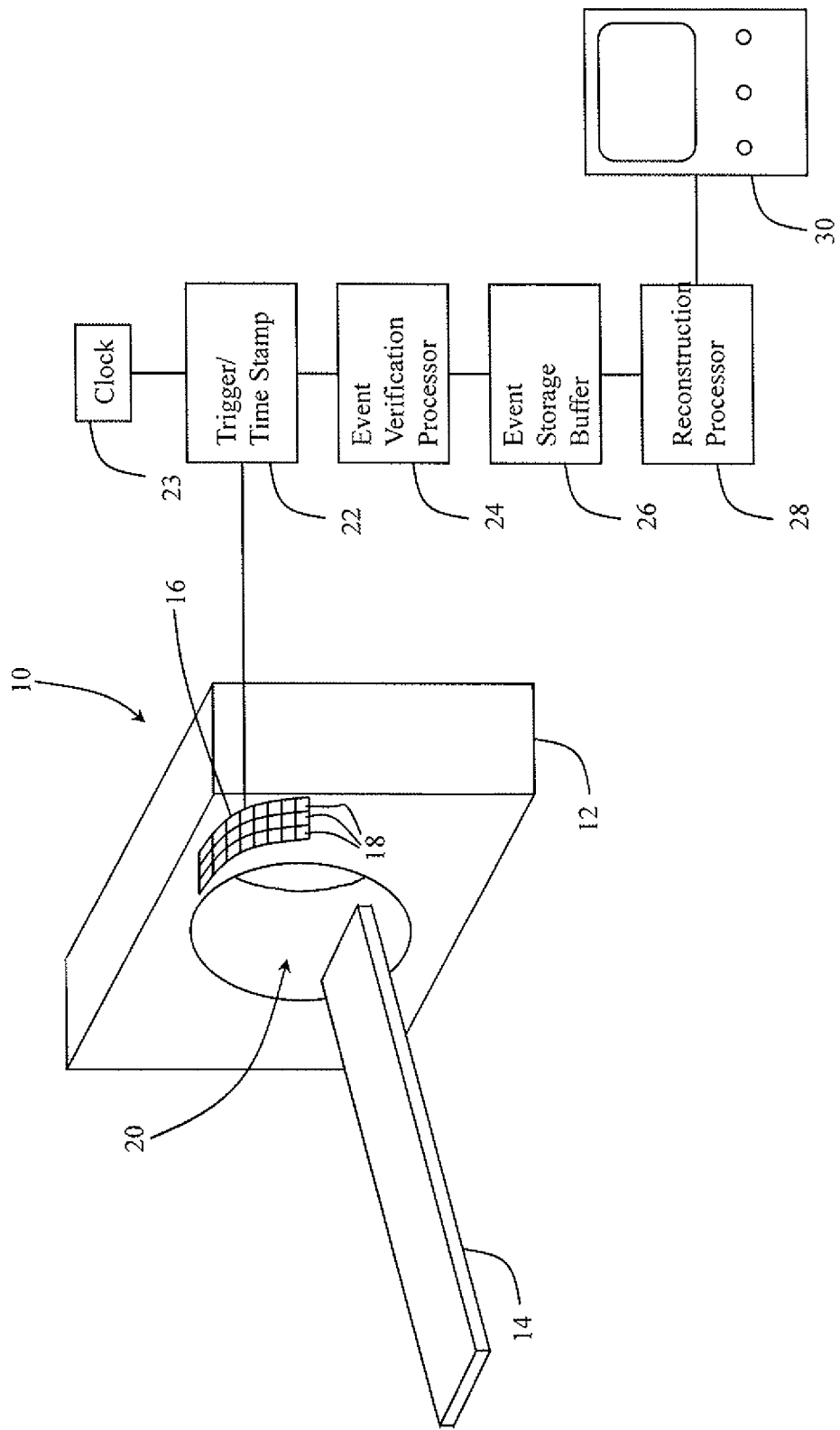
FIG. 1 is a diagrammatic illustration of a nuclear imaging device, in accordance with the present application.

With reference to FIG. 1, a diagnostic imaging device 10 includes a housing 12 and a subject support 14. Enclosed within the housing 12 is a detector array 16. The detector array 16 includes a plurality of individual detector elements 18. While one particular embodiment is described with reference to a positron emission tomography (PET) scanner, it is to be understood that the present application is also useful in astrophysics, such as in gamma ray telescopes, radiography, security, industrial, and other medical applications, such as single photon emission computed tomography (SPECT) and x-ray. Generally, the present application finds use in imaging x-rays, gamma rays, or other charged particles with high energy and spatial resolution. The array 16 is arranged so that detector elements 18 are disposed adjacent an imaging region 20. The detector array 16 can be a ring of detectors 18, multiple rings, one or more discrete flat panels, or the like. In positron emission tomography (PET), pairs of gamma rays are produced by a positron annihilation event in the imaging region and travel in opposite directions. These gamma rays are detected as pairs, with a slight delay (on the order of nanoseconds) between detections if one gamma ray travels farther to reach a detector than the other. Accordingly, in PET scanners, the detector arrays encircle the imaging region.

Before the PET scan commences, a subject is injected with a radiopharmaceutical. The radiopharmaceutical contains a radioactive element coupled to a tag molecule. The tag molecule is associated with the region to be imaged, and tends to gather there through normal body processes. For example, rapidly multiplying cancer cells tend to expend abnormally high amounts of energy duplicating themselves. So, the radiopharmaceutical can be linked to a molecule, such as glucose that a cell typically metabolizes to create energy, gather in such regions and appear as "hot spots" in the image. Other techniques monitor tagged molecules flowing in the circulatory system.

For PET imaging, the selected radioisotope emits positrons. The positron can only move a very short distance (on the order of millimeters) before it is annihilated in an annihilation reaction that creates two oppositely directed gamma rays. The pair of gamma rays travel in opposite directions at the speed of light striking an opposing pair of detectors to define a line of response (LOR).

When a gamma ray strikes the detector array 16, a time signal is generated. A triggering processor 22 monitors each detector 18 for an energy spike, e.g., integrated area under the pulse, characteristic of the energy of the gamma rays generated by the radiopharmaceutical. The triggering processor 22 checks a clock 23 and stamps each detected gamma ray with a time of leading edge receipt stamp. The time stamp is first used by an event verification processor 24 to determine which gamma rays are a pair which defines a line of response (LOR). Because gamma rays travel at the speed of light, if detected gamma rays arrive more than several nanoseconds apart, they probably were not generated by the same annihilation event and are discarded. Timing is especially important in time of flight PET (TOF-PET), as the minute difference in substantially simultaneous events can be used to further localize the annihilation event along the LOR. As the temporal resolution of events becomes more precise, the higher the accuracy with which an event can be localized along its LOR. In a SPECT camera, the LOR or trajectory for each detected gamma ray is determined by collimation.

LORs are stored in an event storage buffer 26, and a reconstruction processor 28 reconstructs the LORs into an image representation of the subject using filtered backprojection or other appropriate reconstruction algorithm. The reconstruction can then be displayed for a user on a display device 30, printed, saved for later use, and the like.

Figure 2:
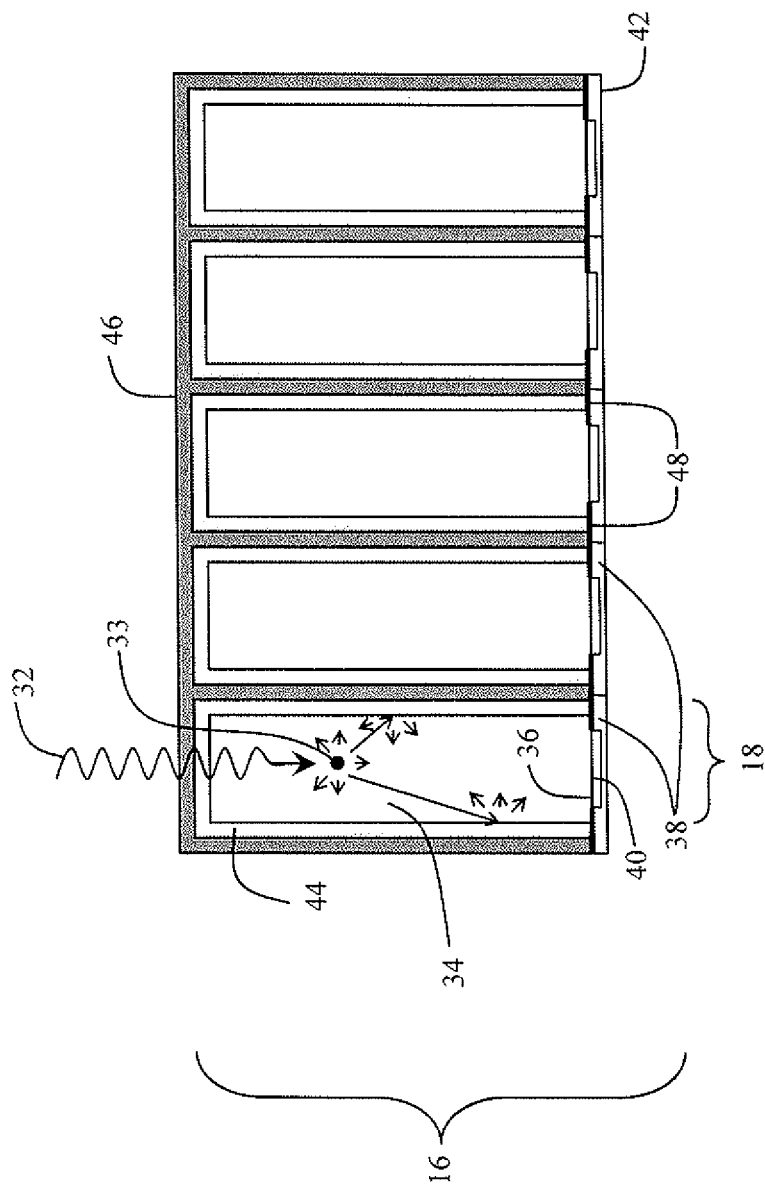
FIG. 2 is a cross sectional view of an array of detector elements, with a first reflective layer that envelops a scintillator on five of six sides, including a third reflective layer on non-light sensitive elements of a detector.

With reference to FIG. 2, a portion of the detector array 16 is shown. When a gamma ray 32 strikes the detector array 16 it interacts with the individual detector elements 18. First, the gamma ray 32 strikes a scintillator 34. The scintillator 34 converts the gamma ray 32 into a burst of light or scintillation events 33 comprising multiple electromagnetic radiation photons. Some of the photons pass through a light emitting or discharging face 36 of the scintillator 34 and hit a solid state photodetector 38, such as an SiPM. The light emitting face 36 of the scintillator is larger in surface area than a light sensitive surface 40 of the photodetector 38, e.g. 4×4 mm$^2$ vs. 2×2 mm². The photodetectors 38, along with their associated electronics, that is, non-light sensitive circuit elements, are carried upon a substrate 42.

In one embodiment, the photodetectors 38 are solid state silicon photodetectors, (SiPMs) but it is to be understood that photodiodes and other light detectors are also viable, and are certainly contemplated, as are continuous light guides and larger area PMTs. In one embodiment cerium doped lutetium yttrium orthosilicate, (LYSO) scintillators are used to produce visible light in the blue-green wavelength range. Other scintillators, such as cadmium tungstate, (CWO) bismuth germanium oxide, (BGO) gadolinium orthosilicate, (GSO) cerium doped lutetium orthosilicate, (LSO) lanthanum bromide, lead sulfate, cerium fluoride, cerium doped lanthanum fluoride, and the like are also contemplated. Scintillators such as $BaF_2$ or $LaBr_3$ would emit electromagnetic radiation with shorter wavelengths, e.g., in the 220 nm to 370 nm range.

Only a fraction of light from the scintillation burst heads toward the photodetector 38 directly. With reference again to FIG. 2, a first diffuse reflective layer 44 at least partially envelops each scintillator 34. The first reflective layer 44 can be a polymer, such as polytetrafluoroethelene, and for example, Teflon™ in one embodiment. Similar light diffusing materials such as fluorinated ethylene-propylene, and perfluoroalkoxy polymer resin have also been contemplated. With the first reflective layer 44 in place, photons that try to exit from the scintillator 34 through the first reflective layer 44 are diffusely reflected back into the scintillator 34 or diffused and exit the first reflective layer 44. Teflon™ is a strong candidate material for the first reflective layer 44 because of its light diffusing characteristics. With diffuse reflection, the light output is improved leading to a better temporal and energy resolution. For diffuse reflectors, the angle of reflection is independent of the angle of incidence. According to Lamberts law, the intensity of the reflected beam of photons is proportional to the cosine of the angle with the surface normal, which relationship results in a distribution of reflected photons that is focused in the direction of the normal to the reflective surface, irrespective of the path of the incident photons, a phenomenon known as forward focusing. The end result is that the intensity of the reflected light is greater. A thin coating of Teflon™, like other diffuse reflectors is partially transmissive allowing part of the light to pass into a neighboring scintillator.

Better reflection is desired to channel as much of the scintillated light as possible into the coupled photodetector. To this end, a second specular reflective layer 46 partially envelops the scintillators 34 and the first diffuse reflective layer 44. For compactness the second reflective layer 46 is reflective on both surfaces or coated on a transparent substrate. This includes, but is not limited to a double sided mirror. The second reflective layer 46 is opaque to visible light in one embodiment, to prevent light from exiting the system, or entering other scintillators 34. While being opaque to visible light, it is to be understood that the second reflective layer 46 is still substantially transparent to gamma radiation. The second reflective layer 46 is also highly reflective, so that all or nearly all of the light that strikes the second reflective layer 46 is reflected back into the scintillator 34. The second reflective layer is a specular reflector, such as an aluminum coated plastic foil or a dielectric reflector, or a polished metal layer. In another embodiment, reflective particles embedded in a resin binder are used. Other opaque, highly reflective materials have also been contemplated. The second reflective layer is thin, relative to the size of the scintillator 34, on the order of about 70 μm.

Figure 3:
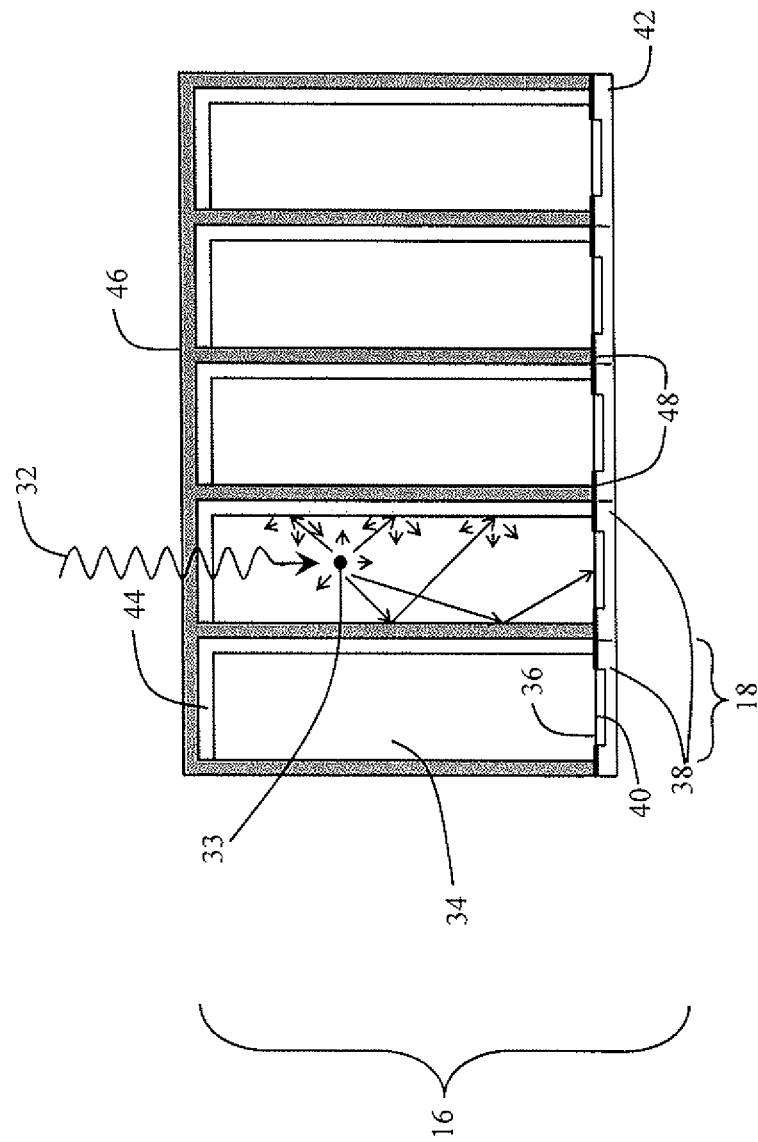
FIG. 3 is a cross sectional view of several detector elements, with a first reflective layer that envelops a scintillator on three of six sides, including a third reflective layer on non-light sensitive elements of a detector.

In the embodiment of FIG. 2, the first reflector 44 encloses the scintillator 34 on five of six sides. In another embodiment, as shown in FIG. 3, the first or diffuse reflector 44 encloses the scintillator 34 on three of six sides (two are shown in the cross-sectional view). Two or four sides are also possible. In the illustrated embodiments, the second reflector 46 envelops each scintillator 34, channeling the scintillated light to the sixth, light emitting face 36 of the scintillator. The higher light output leads to less photon noise on the photodetector 18 enabling better energy and timing resolution, thus improving the overall detection characteristics of the detector elements 18.

The light that passes through the thin diffusely reflective layer 44 diffuses as it passes through. Thus, the light that passes through the diffusely reflective layer 44 passing from the scintillator 34 to the second reflective layer 46 is at least partially diffused before being reflected. The light reflected by the second reflective layer 46 is in part diffused as it passes through the diffusely reflective layer 44 back into the scintillator 34 and in part is diffusely reflected back toward the second reflective layer 46. Because light reaching the second reflective layer 46 passes through the diffusing layer 44 at least twice, a thinner layer of Teflon™ can be used.

To manufacture the array, sheets of reflective material are inserted between adjacent scintillators 34. Each sheet is formed by sputtering aluminum on both sides of a very thin, e.g. 70 μm thick, polymeric sheet. Then a Teflon™ sheet is attached on both aluminum layers in FIG. 2, and on one aluminum layer in FIG. 3. The thicker the Teflon™ layers 44, the greater the diffusion. But to maintain a specific pitch, the thicker the reflective layers, however, the smaller the cross section of the scintillators 34 and the lower the overall conversion efficiency of the gamma rays to light. The embodiment of FIG. 3 is advantageous in that the reflective layers are thinner (by the thickness of a Teflon™ layer) hence the conversion efficiency is higher. The embodiment of FIG. 2 is advantageous in that it maximizes the diffuse reflective surface.

Alternately, the Teflon™ can be attached to the scintillators 34 and aluminum coated polymeric layers can be inserted between scintillators 34. But because Teflon™ is a porous surface, (fibers with air pockets) sputtering a thin aluminum coating on Teflon™ does not create a light opaque mirrored surface. Of course, other diffuse and reflective materials can be substituted for Teflon™ and aluminum. On the top surface where thickness is less of an issue, similar constructions can be used. Thicker constructions are also an option.

In both the embodiments of FIGS. 2 and 3, the light emitting face 36 of the scintillator 34 has a larger area than the light receiving face 40 of the photodetector. Light that did not exit from a portion of the scintillator that was directly coupled to the detector could be lost in the non-light sensitive portions of the photodetectors 38 that support the light receiving faces 40. In order to ensure that the light that does not initially hit the light receiving face 40 is not lost, the non-light sensitive portions of the photodetector 38 are coated with a support component reflective layer 48. Light that strikes the reflective layer 48 is reflected back up into the scintillator 34 where it is further reflected and diffused by the diffusively reflective layer 44 and the second reflective layer 46. Eventually, the light that initially hit the support component reflective layer 48 will be reflected around within the scintillator and reach the light receiving face of the photodetector 40. The interface between the light emitting face 36 of the scintillator 34 and the light sensitive region of the photodetector 40 is coated with a non-reflective optical coupling gel or adhesive to minimize reflection from the light sensitive region 40. An antireflective coating could also be used that includes a dielectric stack of one or more layers.

In this embodiment, light that is reflected around within the scintillator 34 contributes to the energy resolution of the produced signal. Since the light does take some non-zero time (on the order of picoseconds) to reflect about the scintillator, however, it is not used for timing purposes. Rather, photons that strike the light sensitive face 40 of the photodetector 38 directly from the scintillation burst, without reflecting, are used to trigger a timing indicator. Thus, all or nearly all of the light that is produced from any given scintillation ends up being detected. The light produced either hits the detector 40 or a reflective surface. After one or more reflections, the light that does not initially hit the detector 40 eventually ends up at the detector 40. Typical devices have a detection efficiency of about 50%, so the addition of the support component reflective layer 48 can boost the detection efficiency by as much as a factor of 2.

The support component reflective layer 48 can be made of a dielectric stack of one or more layers. It can also be a metal coating, or a combination of a metal coating and a dielectric stack.

Application of the support component reflective layer 48 to the non-light sensitive circuit components allows the size of the light sensitive face 40 to be decreased, since all of the light that the scintillator produces eventually arrives at the light sensitive face 40. This increases the timing resolution of the detector 38 without sacrificing any energy resolution as the entire scintillation is still detected. This is true for both analog and digital SiPMs.

Figure 4:
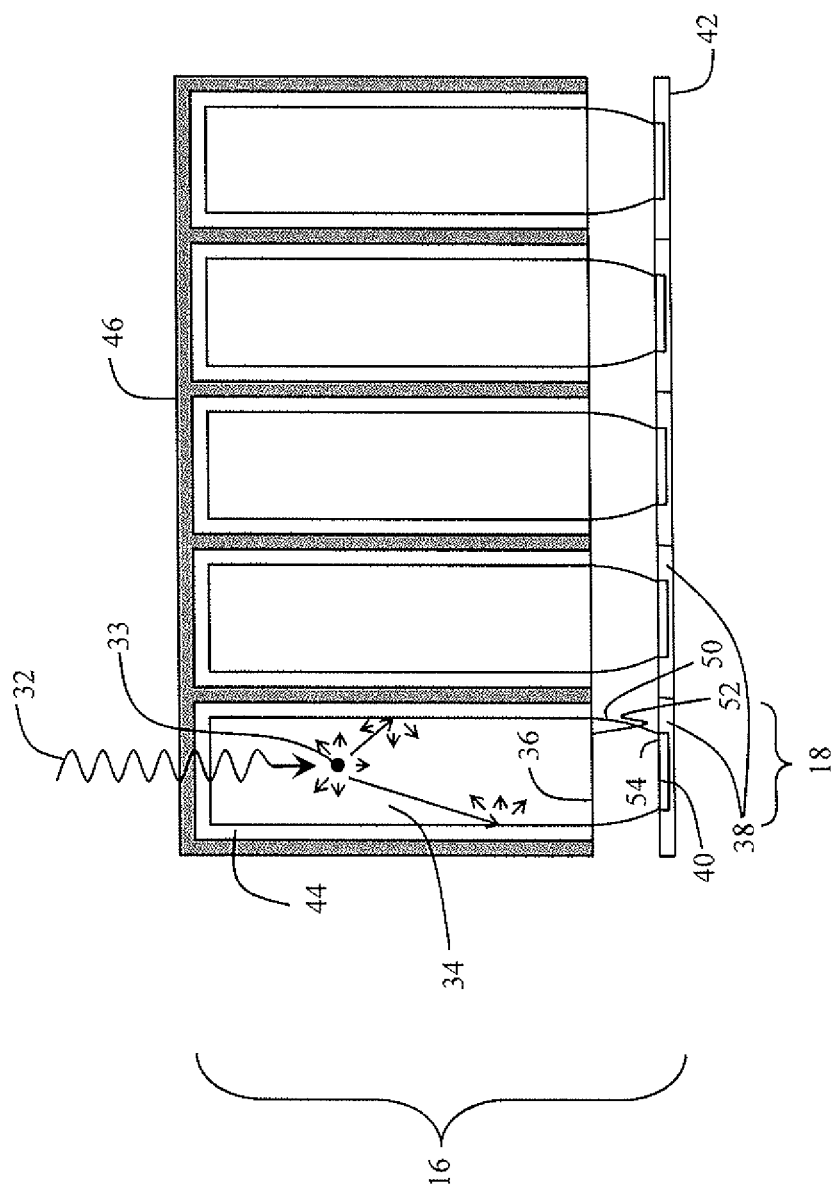
FIG. 4 is a cross sectional view of an array of detector elements, with a first reflective layer that envelops a scintillator on five of six sides, including light concentrating elements.
Figure 5:
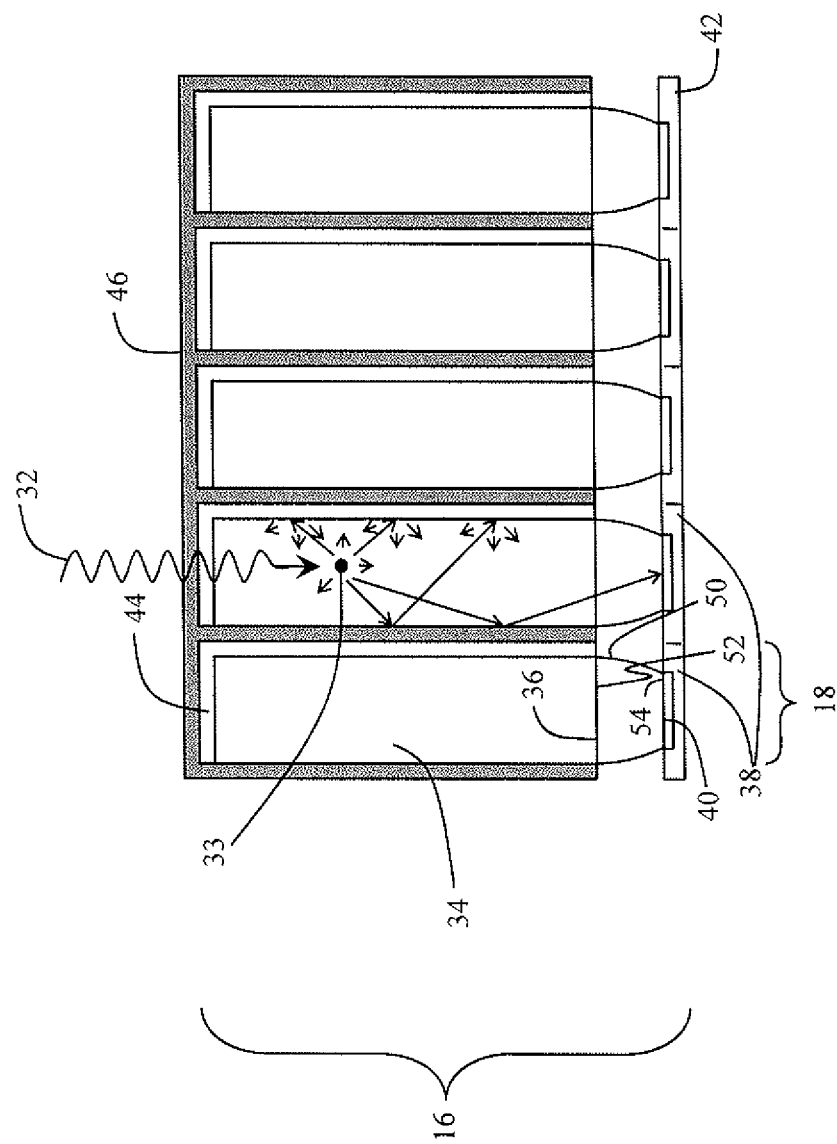
FIG. 5 is a cross sectional view of several detector elements, with a first reflective layer that envelops a scintillator on three of six sides, including light concentrating elements.

In another embodiment, as can be seen in FIGS. 4 and 5, a light concentrator 50 is disposed between the scintillator 34 and the photodetector 38. The light concentrator 50 has a light receiving face 52 and a light emitting, or discharging face 54. The light receiving face 52 of the concentrator 50 is optically coupled to the light emitting face 36 of the scintillator 34. The faces 52 and 36 have substantially the same surface area and geometric shape. This way any light that exits the scintillator 34 through face 36 will enter the concentrator 50. An optical coupling gel or adhesive is provided at the interface between the scintillator 34 and the light concentrator 50. Similarly, the light emitting face 54 of the concentrator 50 is substantially the same surface area and geometric shape as the light sensitive region 40 of the photodetector 38, and an optical coupling gel or adhesive is also provided at that interface. The index of refraction of the gel is between the two indices of refraction of the materials which the gel is physically between, to minimize reflection at the interface. In the case of PMTs as detectors using standard Anger logic to identify the scintillators, a light guide, such as a continuous light guide or a gaped light guide, between the scintillator and the PMT would be employed.

The concentrator 50 channels the light that enters the light receiving face 52 to the light emitting face 54 without significant losses. The desired compression ratio is selected by choosing the index of refraction of the concentrator 50 relative to the index of refraction of the scintillator 34 and the light sensitive region 40. Let $n_1$ be the index of refraction of the scintillator 34, $n_2$ be the index of refraction of the concentrator 50 and $n_3$ be the index of refraction of the light sensitive region of the photodetector 38. Generally, $n_1 \leq n_2 \leq n_3$. The compression rate is about $(n_2/n_1)^2$.

As shown in FIGS. 4 and 5, certain embodiments include concentrators 50 that have truncated parabolic cross sections. When light enters the concentrator 50 the packets of light are transformed into narrow cones, according to Snell's law of refraction. Thus, the angular distribution of the rays inside the scintillator 34 of 90° are reduced to $\delta$, where $\delta = \arcsin(n_1/n_2) < 90°$. As is known from the theory of optical light collection, a 3D structure called a dielectric parabolic concentrator compresses diffuse light with an incidence angle of $\delta_0$ and an incidence area of $a_i$ to an output area $a_o$ that depends on $\delta_0$ without significant losses.

$$a_o = a_i \sin^2(\delta_0)$$
$$= a_i (n_1/n_2)^2$$

Other shapes for the concentrator 50 have also been contemplated, such as a truncated pyramid, with straight or flat edges instead of parabolic. The parabolic concentrator 50 has the most efficient light concentration properties, but other shapes or orientations are certainly viable.

Figure 6:
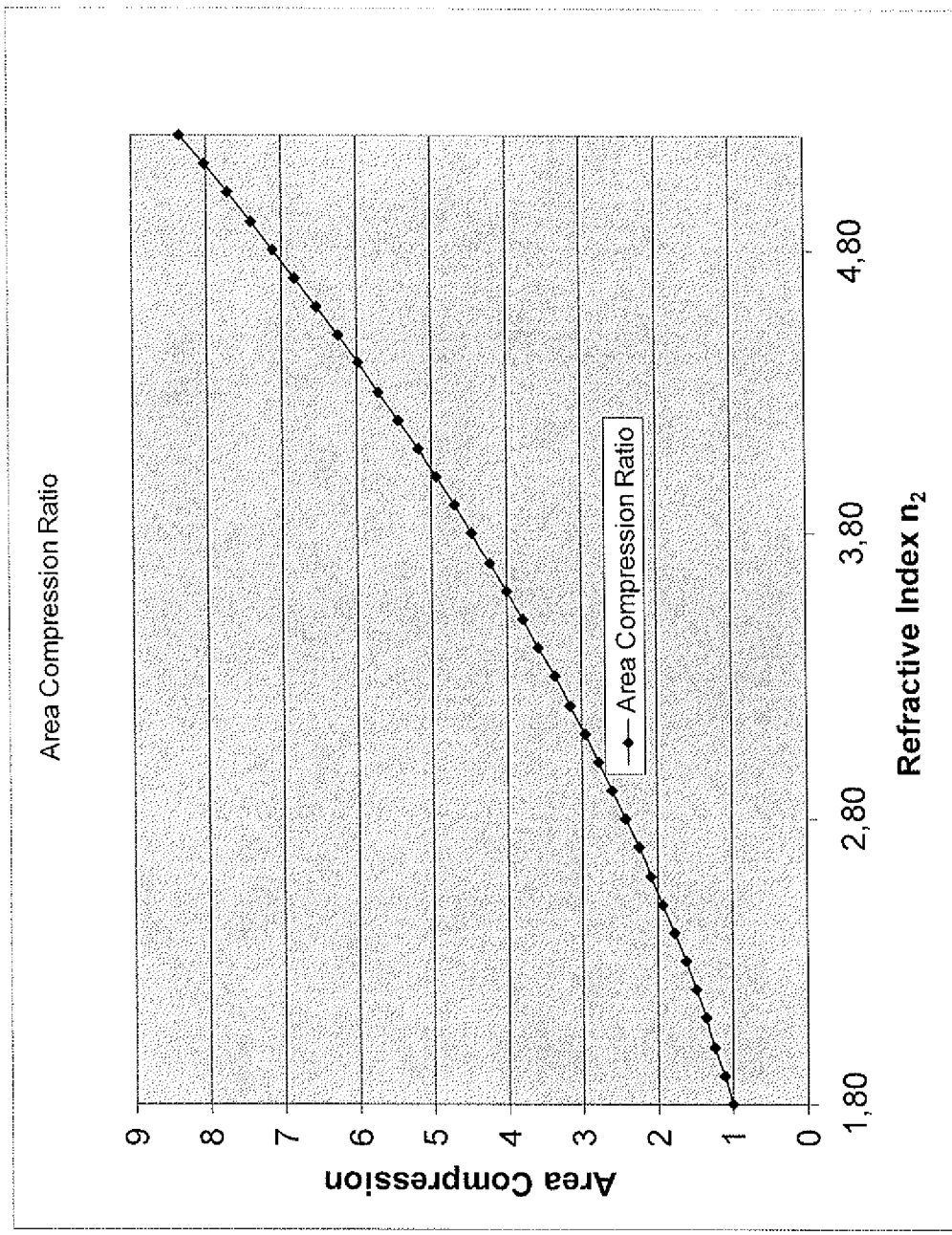
FIG. 6 is a graph of area compression versus the refractive index of a concentrator material.

Thus, substantially 100% of the diffuse scintillator light is compressed into a smaller area due to the differences in the indices of refraction of the scintillator 34 and the light concentrator 50. In one embodiment, with a silicon concentrator and a LYSO scintillator, with the surface area of the light receiving face 40 of the photodetector 38 being approximately 25% of the surface area of the light emitting face 36 of the scintillator 34, the photodetector 38 can receive substantially 100% of the diffuse light emitted from the scintillator 34. A graph of area compression versus refractive index ($n_2$) of the concentrator 50 is shown in FIG. 6.

Figure 7:
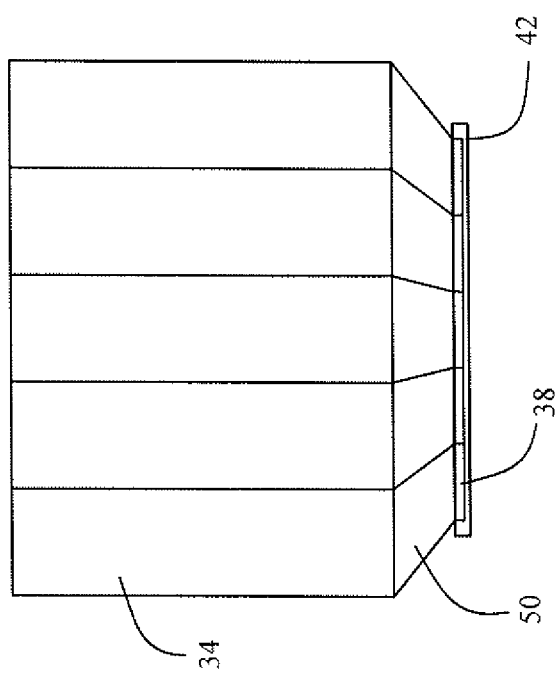
FIG. 7 is a cross sectional view of another embodiment of an array of detector elements where the detectors are arranged tightly.

With reference now to FIG. 7, an array of photo sensitive regions 38 is shown tightly grouped, as opposed to the spaced array 42 of FIGS. 4 and 5. In the embodiment of FIG. 7, each light concentrator 50 is shaped to channel the light to its respective light sensitive region 38, even though they may be as well as of different cross sections. In this embodiment, the light sensitive elements of the photodetectors 38 can be tightly grouped, and the associated electronics can be located elsewhere on the substrate 42. It is to be understood that the first and second reflective layers 44, 46 are still present, but not illustrated in FIG. 7 as they are very thin when compared to the scintillators 34.

Figure 8:
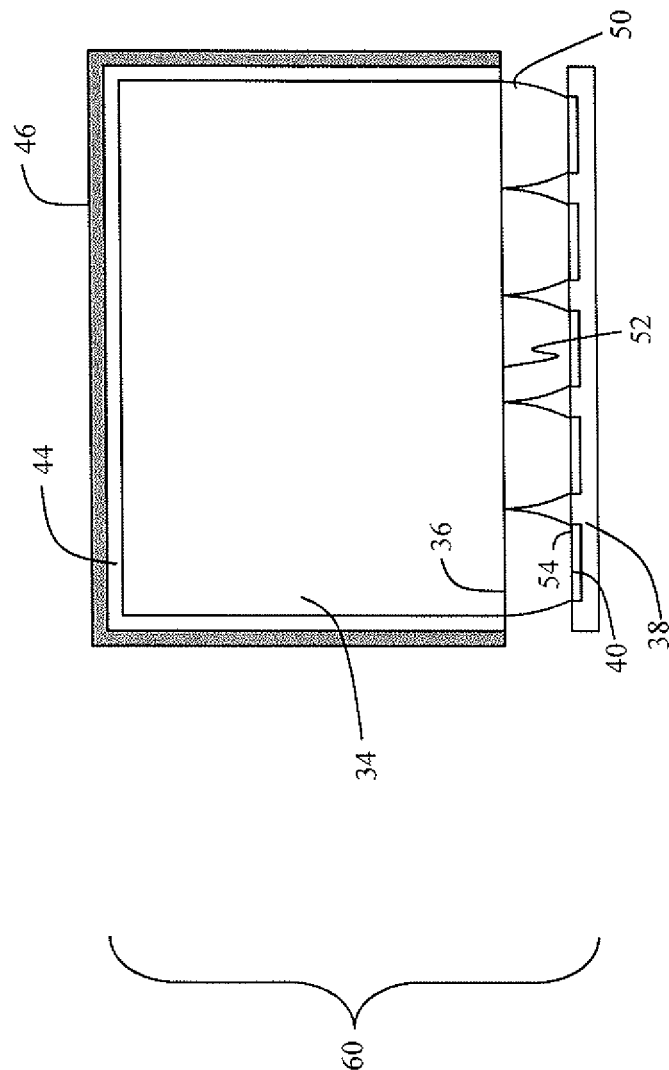
FIG. 8 is a cross sectional view of a detector element that includes a single scintillation crystal coupled to multiple light concentrators.

In an alternate embodiment, as shown in FIG. 8, the detector array includes a plurality of detector elements 60. Each detector element 60 includes a single scintillation crystal 34 such as LYSO. A plurality of light concentrators 50 couple the scintillation crystal 34 to light sensitive portions of photodetectors 38. In this embodiment, one scintillator 34 is coupled to a detector that includes an array of photosensitive elements. As with the other embodiments, the scintillation crystal 34 is still encased in the first 44 and second 46 reflective layers.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A radiation detector array comprising:
   a plurality of scintillation crystals, that emit bursts of light in response to radiation; a plurality of photodetectors, each photodetector having a light sensitive region optically coupled with at least one optical coupling element to a light emitting face of at least one scintillation crystal; a diffuse reflective layer, at least partially enclosing each scintillation crystal, the diffuse reflective layer diffusely reflecting a first portion of the light emitted by the scintillation crystal and incident upon the diffuse reflective layer and passing a second portion of the emitted light; a specular reflective layer, adjacent the first reflective layer such that the first portion of the light that has passed through the diffuse reflective layer back towards the diffuse reflective layer and the scintillation crystal.

2. The radiation detector array as set forth in claim 1, wherein the light emitting faces have a larger area than the light sensitive regions and wherein the at least one optical coupling element includes a plurality of light concentrator elements that optically couple the light emitting faces of the scintillation crystals and the light sensitive regions of the photodetectors.

3. The radiation detector array as set forth in claim 2, wherein the concentrator elements are at least partially parabolic.

4. The radiation detector array as set forth in claim 2, wherein the light concentrator elements have indices of refraction greater than indices of refraction of the scintillation crystals and the indices of refraction of the concentrator elements are less than indices of refraction of the light sensitive regions, and further including:
  a first optical coupling agent between each scintillator light emitting face and its associated light concentrator, the first optical coupling agent having an index of refraction greater than or equal to the index of refraction of the scintillator crystal and less than or equal to the index of refraction of the light concentrator; and
  a second optical coupling agent between each concentrator light emitting face and its photosensitive region, the second optical coupling agent having an index of refraction greater than or equal to the index of refraction of the concentrator and less than or equal to the index of refraction of the light sensitive region.

5. The radiation detector array as set forth in claim 1, wherein the scintillation crystal is a six-sided crystal and the diffuse reflective layer encloses the scintillation crystal on five of the six sides.

6. The radiation detector array as set forth in claim 1, wherein a polymeric film is coated on both faces of the specular reflective layers and the specular layers are each coated with the diffuse reflective layer, the polymeric film coats with the specular and diffuse reflective layers being disposed between adjacent scintillation crystals.

7. The radiation detector array as set forth in claim 1, wherein the photodetectors include silicon photomultipliers (SiPMs) with light sensitive regions that have a larger area than the light emitting face of one of the scintillation crystals and the plurality of scintillation crystals are optically coupled to one of the SiPMs with standard Anger logic is used to identify in which of the plurality of scintillation crystals the scintillation occured.

8. The radiation detector array as set forth in claim 1, wherein
  the first diffuse reflective layer includes at least one of polytetrafluoroethelene, fluorinated ethylene propylene, and perfluoroalkoxy polymer resin; and
  the second specular reflective layer includes at least one of a specular reflector on a dielectric support and a specular reflector made of a polished metal sheet.

9. A radiation detector array comprising:
  a plurality of scintillation crystals that emit bursts of light in response to radiation;
  a plurality of photodetectors, each photodetector having a light sensitive region and a non-light sensitive region;
  at least one optical coupling element which optically couples a light emitting face of at least one scintillation crystal to the light sensitive region of the photodetector, the light emitting face of the scintillation crystal being larger than the light receiving face of the photodetector;
  a first reflective layer at least partially enclosing each scintillation crystal, the first reflective layer diffusely reflecting a first portion of the light emitted by the scintillation crystal and incident upon the first reflective layer and passing a second portion of the emitted light;
  a second reflective layer adjacent the first reflective layer for reflecting light that has passed through the first reflective layer back towards the first reflective layer and the scintillation crystal; and
  a support component reflective layer disposed on the non-light sensitive region of each photodetector that reflects light incident on the non-light sensitive regions from the light emitting face of the scintillation crystal back into the scintillation crystal.

10. A method of radiation detection comprising:
  emitting light with a scintillation crystal in response to a high energy photon;
  diffusing the light with a diffuse reflective layer that at least partially encloses the scintillation crystal;
  reflecting the light that passed through the diffuse reflective layer back to the scintillation crystal with a first opaque reflective layer adjacent the diffuse reflective layer;
  allowing the light to leave the scintillation crystal from a light emitting face of the scintillation crystal;
  detecting the light at a photodetector that has a light receiving face.

11. The method as set forth in claim 10, further including:
  coupling the light emitting face of the scintillation crystal to a wide end of a light concentrator;
  coupling a narrow end of the light concentrator to the light receiving face of the photodetector;
  concentrating the light emitted from the scintillation crystal with the light concentrator from the surface area of the light emitting face of the scintillation crystal to the surface area of the light receiving face of the photodetector.

12. The method as set forth in claim 11, further including:
  selecting an index of refraction of the light concentrator to be greater than or equal to an index of refraction of the scintillation crystal and less than or equal to an index of refraction of the photodetector.

13. The method as set forth in claim 10, wherein the step of diffusing includes diffusing the light with a layer of one of polytetrafluoroethelene, fluorinated ethylene-propylene, and perfluoroalkoxy polymer resin.

14. The method as set forth in claim 10, further including:
  coating two sides of a polymeric film with an opaque reflective coating to form the opaque reflective layer;
  coating one of crystal surfaces and the opaque reflective layer with a diffusely reflective coating to define the diffuse reflective layer; and
  sandwiching the coated polymeric film between adjacent faces of the scintillation crystal and an adjacent scintillation crystal.

15. The method as set forth in claim 10, further including:
  reflecting a portion of light allowed to leave the scintillation crystal that strikes a non-light sensitive portion of the photodetector back into the scintillation crystal with an opaque support component reflective layer disposed on the non-light sensitive portion.

16. A radiation detector array that includes a plurality of detection elements, each detection element comprising:

a scintillation crystal that emit bursts of light in response to radiation and has a light emitting face of a first cross section;

a plurality of photodetectors, each photodetector having a light sensitive region of a second cross section and additional, non-light sensitive electronics, the light sensitive region being optically coupled to a portion of the light emitting face of the scintillation crystal the first cross section being larger than the second cross section;

a diffuse reflective layer at least partially enclosing the scintillation crystal, the diffuse reflective layer diffusely reflecting a first portion of the light emitted by the scintillation crystal and incident upon the diffuse reflective layer and passing a second portion of the emitted light;

a specular reflective layer adjacent the diffuse reflective layer for reflecting light that has passed through the diffuse reflective layer back towards the diffuse reflective layer and the scintillation crystal; and one of a support component reflective layer coating the non-light sensitive electronics that reflects light incident upon the non-light sensitive electronics back into the scintillation crystal, and a plurality of light concentrators having a light receiving face of the first cross section and a light discharging face of the second cross section, each light concentrator optically coupling the light sensitive region of one of the plurality of photodetectors to a portion of the light emitting face of the scintillation crystal.

17. The radiation detector array as set forth in claim 16, wherein the at least one optical coupling element includes a plurality of light concentrator elements that optically couple the light emitting faces of the scintillation crystals and the light sensitive regions of the photodetectors.

18. The radiation detector array as set forth in claim 16, wherein the concentrator elements include parabolicly shaped side walls.

19. The radiation detector array as set forth in claim 16, wherein the light concentrator elements have indices of refraction greater than indices of refraction of the scintillation crystals and the indices of refraction of the concentrator elements are less than indices of refraction of the light sensitive regions, and further including:

a first optical coupling agent between each scintillator light emitting face and its associated light concentrator, the first optical coupling agent having an index of refraction greater than or equal to the index of refraction of the scintillator crystal and less than or equal to the index of refraction of the light concentrator; and a second optical coupling agent between each concentrator light emitting face and its photosensitive region, the second optical coupling agent having an index of refraction greater than or equal to the index of refraction of the concentrator and less than or equal to the index of refraction of the light sensitive region.

20. The radiation detector array as set forth in claim 16, wherein the first reflective layer includes at least one of polytetrafluoroethelene, fluorinated ethylene propylene, and perfluoroalkoxy polymer resin; and the second reflective layer includes at least one of a specular reflector on a dielectric support and a specular reflector made of a polished metal sheet.

* * * * *